US012789676B2

(12) United States Patent
Zhao

(10) Patent No.: US 12,789,676 B2
(45) Date of Patent: Nov. 10, 2026

(54) LAP BELT LENGTH ADJUSTING DEVICE AND CHILD SAFETY SEAT

(71) Applicant: WONDERLAND SWITZERLAND AG, Steinhausen (CH)

(72) Inventor: Guanghui Zhao, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 118 days.

(21) Appl. No.: 18/220,965

(22) Filed: Jul. 12, 2023

(65) Prior Publication Data

US 2024/0017650 A1 Jan. 18, 2024

(30) Foreign Application Priority Data

Jul. 12, 2022 (CN) ......................... 202221802046.1
Nov. 18, 2022 (CN) ......................... 202211448798.7

(51) Int. Cl.
*B60N 2/28* (2006.01)

(52) U.S. Cl.
CPC ......... *B60N 2/2812* (2013.01); *B60N 2/2816* (2023.08)

(58) Field of Classification Search
CPC ............................ B60N 2/2812; B60N 2/2816
See application file for complete search history.

(56) References Cited

U.S. PATENT DOCUMENTS 4,826,246 A * 5/1989 Meeker ................ B60N 2/2806 297/256.13
5,286,090 A 2/1994 Templin et al.
6,371,563 B1 * 4/2002 Washizuka .............. B60R 22/38 242/383.2
7,343,650 B2 * 3/2008 Baldwin ................ A44B 11/14 24/503

(Continued)

FOREIGN PATENT DOCUMENTS

AU 2015213404 A1 3/2016
CN 101224717 A 7/2008

(Continued)

OTHER PUBLICATIONS

JP Notice of Reasons for Refusal with English Translation; Application No. 2023-100413; Date Mailed: Jun. 4, 2024; pp. 1-10.

(Continued)

*Primary Examiner* — Philip F Gabler
(74) *Attorney, Agent, or Firm* — CANTOR COLBURN LLP

(57) ABSTRACT

The present disclosure provides a lap belt length adjusting device for a child safety seat, which includes a fixing end and a free end, the fixing end is fixed to a seat part of the child safety seat, and the free end is pulled by a user, the lap belt length adjusting device includes: an adjusting structure arranged at the seat part and through which the free end passes, wherein after the free end passes through the adjusting structure, a length of a use section of the lap belt between the fixing end and the adjusting structure can be increased or (Continued)

decreased; and a locking structure for locking or unlocking the lap belt between the adjusting structure and the free end, to prevent or allow an increase or decrease in the length of the use section of the lap belt between the fixing end and the adjusting structure.

13 Claims, 7 Drawing Sheets

(56) References Cited

U.S. PATENT DOCUMENTS

| | | | | |
|---|---|---|---|---|
| 7,488,038 | B2 * | 2/2009 | Boyle | B60N 2/2809 297/484 |
| 7,658,446 | B2 * | 2/2010 | Meeker | B60N 2/2821 297/256.16 |
| 8,272,689 | B2 | 9/2012 | Biaud et al. | |
| 8,444,222 | B2 * | 5/2013 | Buckingham | B60N 2/2809 297/256.16 |
| 8,955,915 | B2 | 2/2015 | Mason et al. | |
| 9,278,666 | B2 * | 3/2016 | Leese | B60R 22/48 |
| 9,758,067 | B2 * | 9/2017 | Williams | B60N 2/2816 |
| 10,604,034 | B2 * | 3/2020 | Mason | B60N 2/2863 |
| 2002/0036419 | A1 | 3/2002 | Balensiefer | |
| 2007/0228802 | A1 | 10/2007 | Nakhla | |
| 2008/0168603 | A1 * | 7/2008 | Ayette | B60N 2/2812 5/628 |
| 2013/0099536 | A1 | 4/2013 | Mason et al. | |
| 2017/0043683 | A1 | 2/2017 | Yang et al. | |
| 2017/0267130 | A1 | 9/2017 | Dingman et al. | |
| 2019/0263298 | A1 | 8/2019 | Gay et al. | |

FOREIGN PATENT DOCUMENTS

| | | | |
|---|---|---|---|
| CN | 203698006 | U | 7/2014 |
| CN | 105774604 | A | 7/2016 |
| CN | 106347292 | A | 1/2017 |
| CN | 105774604 | B | 3/2018 |
| CN | 110341559 | A | 10/2019 |
| CN | 211032264 | U | 7/2020 |
| CN | 114604147 | A | 6/2022 |
| CN | 216659665 | U | 6/2022 |
| DE | 202008000987 | U1 | 5/2008 |
| JP | 2008168854 | A | 7/2008 |
| JP | 2010274884 | A | 12/2010 |
| JP | 2019182410 | A | 10/2019 |
| KR | 20190116934 | A | 10/2019 |
| TW | 1551482 | B | 10/2016 |

OTHER PUBLICATIONS

International Search Report for International Application No. PCT/IB2024/000148; International Filing Date: Mar. 18, 2024; Dec. 11, 2024; 6 pages.

Invitation to Pay Additional Fees and Where Applicable Protest Fee for International Application No. PCT/IB2024/000148; International Filing Date: Mar. 18, 2024; Sep. 13, 2024; 8 pages.

Written Opinion for International Application No. PCT/IB2024/000148; International Filing Date: Mar. 18, 2024; Dec. 11, 2024; 8 pages.

EP Communication; Extended European Search Report; Application No. 23179104.7-1012; Date Mailed: Dec. 22, 2023; pp. 1-8.

TW Office Action; 1st Office Action; Application No. 112122651; Date Mailed: Dec. 26, 2023; pp. 1-10.

Taiwanese Application No. 113109871; Office Action with English translation dated Dec. 30, 2024; 22 pages.

Mother's Choice convertible car seat instruction manual; No publication date is known; pp. 1-64.

Opposition—Statement of Grounds and Particulars; Appl No. 2023203905; Date Mailed: Sep. 15, 2025; pp. 1-11.

The Mother's Choice "Infinity Convertible Car Seat" product [Facebook product advertisement dated Sep. 21, 2021 available] https://www.facebook.com/BabyBuntingAus/videos/mothers-choice-infinity-0 8yrs/1207702526377449/; pp. 1-5.

YouTube video titled "Mother's Choice Infinity Car Seat—How to Video" https://www.youtube.com/watch?v=ozZ8JtjzenY; Dec. 14, 2021; pp. 1-4.

JP 1st Office Action with English Translation; App No. 2025-554318; Date Mailed: Jul. 7, 2026; pp. 1-6.

TW 1st Office Action with English Translation; Application No. 114151970; Date Mailed: 2026.06.25; pp. 1-49.

* cited by examiner

LAP BELT LENGTH ADJUSTING DEVICE AND CHILD SAFETY SEAT

CROSS-REFERENCE TO RELATED APPLICATIONS

This application claims priority to Chinese Application No. 2022218020461, filed on Jul. 12, 2022 and Chinese Application No. 2022114487987, filed on Nov. 18, 2022, which are incorporated herein by reference in its entirety.

TECHNICAL FIELD

This disclosure relates to a child safety seat, and more particularly, to a lap belt length adjusting device for the child safety seat.

BACKGROUND

The child safety seat is generally designed with multi-level modes to accommodate children of different sizes. For this purpose, a length and a height of a shoulder belt and a lap belt have to be designed in an adjustable mode.

SUMMARY

An object of the present disclosure is to provide a lap belt length adjusting device and a child safety seat, which can adjust the length of the lap belt to be suitable for children of different sizes and may have the lap belt to be easily adjusted.

As embodied and described herein, in order to achieve these and other advantages and according to the object of the present disclosure, a lap belt length adjusting device for a child safety seat is proposed. A lap belt of the child safety seat includes a fixing end and a free end, the fixing end is fixed to a seat part of the child safety seat, and the free end is pulled by a user, the lap belt length adjusting device includes: an adjusting structure arranged at the seat part and through which the free end passes, wherein after the free end passes through the adjusting structure, a length of a use section of the lap belt between the fixing end and the adjusting structure can be increased or decreased; and a locking structure for locking or unlocking the lap belt between the adjusting structure and the free end, to prevent or allow an increase or decrease in the length of the use section of the lap belt between the fixing end and the adjusting structure.

In an embodiment, the adjusting structure is a first opening penetrating through an upper surface of the seat part, and the free end of the lap belt passes through the first opening to a bottom of the seat part.

In an embodiment, a lower recess is arranged on the upper surface of the seat part, and the locking structure is located in the lower recess.

In an embodiment, the locking structure includes: a fixing case having a U-shaped structure and fixed to the lower recess; a locking member pivoted to the fixing case and comprising an operating end and a locking end, and the operating end being exposed out of the fixing case to be operated by the user, wherein the lap belt passes through the lower recess and then passes through the upper surface on a bottom of the U-shaped structure to be located between the bottom of the U-shaped structure and the locking member, and the locking end of the locking member is configured to press and lock the lap belt.

In an embodiment, the locking structure further includes an elastic member that drives the locking member to lock the lap belt.

In an embodiment, the free end of the lap belt is exposed to the upper surface of the seat part at a side of the seat part.

In an embodiment, a second opening is arranged on the upper surface of the seat part, and the fixing end of the lap belt is fixed to the second opening.

In an embodiment, the fixing end of the lap belt passes through the second opening and then is connected with a fixing member, and the fixing member is blocked by the second opening, such that the fixing end is not withdrawn from the second opening.

In an embodiment, a buckle is slidably connected to the lap belt between the fixing end and the adjusting structure.

In another embodiment, the present disclosure proposes a lap belt of the child safety seat includes a fixing end and a free end, the fixing end is fixed to a seat part of the child safety seat, and the free end is pulled by a user, the lap belt length adjusting device includes an adjustable locking structure fixed to the seat part and through which the free end passes, wherein after the free end passes through the adjustable locking structure, a length of a use section of the lap belt between the fixing end and the adjustable locking structure can be increased or decreased; and the adjustable locking structure is configured to lock or unlock the lap belt passing through the adjustable locking structure, to prevent or allow an increase or decrease in the length of the use section of the lap belt between the fixing end and the adjustable locking structure.

In a further another embodiment, the present disclosure proposes a child safety seat, and the child safety seat employs the aforesaid lap belt length adjusting device.

An advantageous effect of the present disclosure lies in that the lap belt length adjusting device according to the present disclosure can adjust the length of the lap belt to be suitable for children of different sizes, and it is convenient to adjust and operate the lap belt.

The foregoing and other objects, features, aspects and advantages of the present disclosure will become more apparent from the detailed description of the disclosure taken in conjunction with the accompanying drawings.

BRIEF DESCRIPTION OF THE DRAWINGS

The accompanying drawings, which are incorporated in and constitute a part of this specification, illustrate examples consistent with the present disclosure, together with the description, serve to explain the principles of the present disclosure.

In the drawings.

LIST OF REFERENCE NUMBERS

Figure 1:
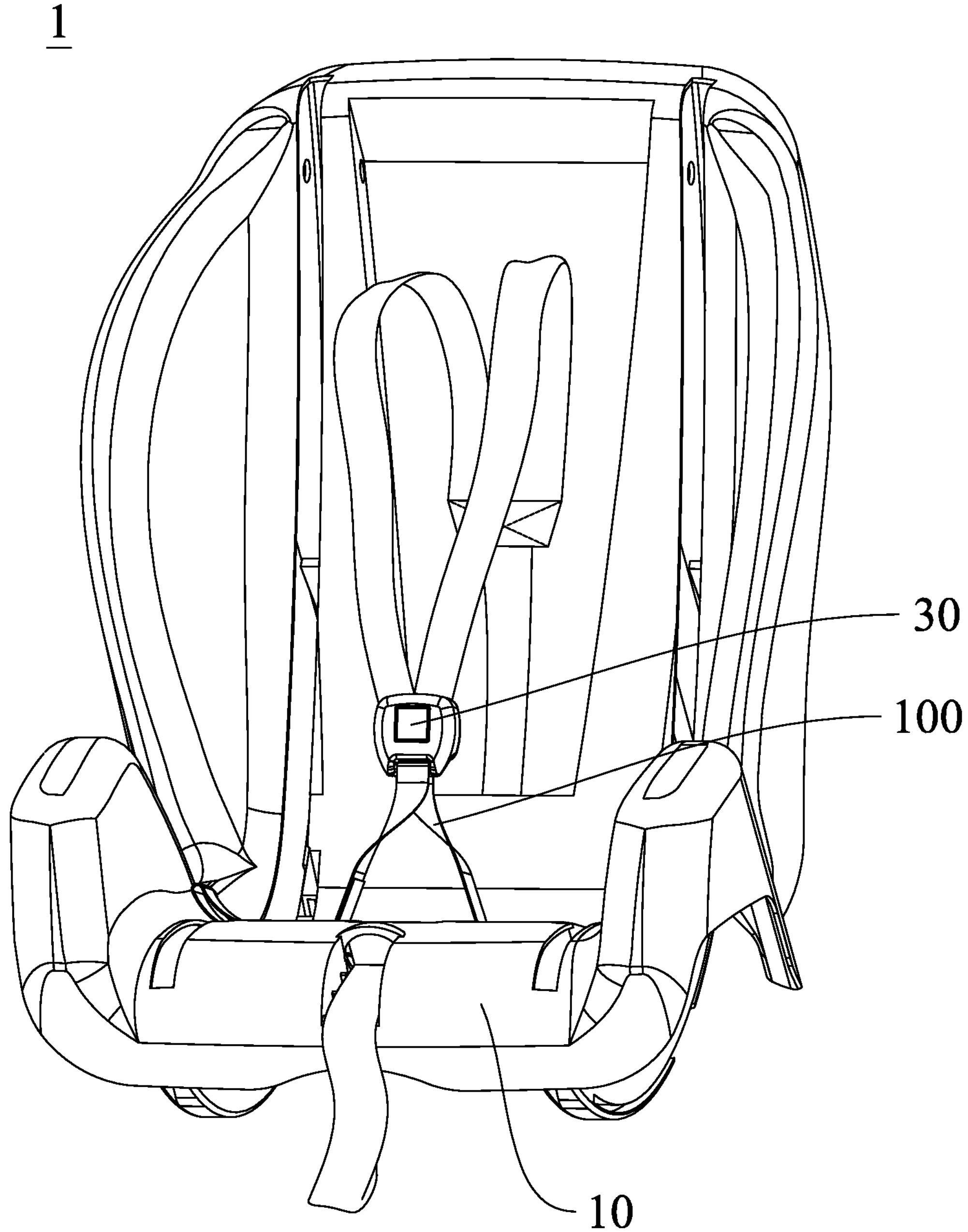
FIG. 1 is a schematic front view of a child safety seat with a lap belt length adjusting device according to an embodiment of the present disclosure.

1 child safety seat
10 seat part
  11 upper surface
  12 lower recess
  13 second opening
20 fixing member
30 buckle
100 lap belt
  101 fixing end
  102 free end
200 adjusting structure
300 locking structure
  310 fixing case
  320 locking member
  321 operating end
    322 locking end
  330 elastic member
400 adjustable locking structure

DETAILED DESCRIPTION

The length of the lap belt of the child safety seat is generally set to be non-adjustable, which can cause discomfort and safety issues for children sitting in the seat due to that a buckle is too low because of excessively short lap belt when the shoulder belt of the child safety seat is being adjusted.

The present disclosure provides a lap belt length adjusting device. Hereinafter, the present disclosure will be described in detail with reference to the accompanying drawings.

Figure 2:
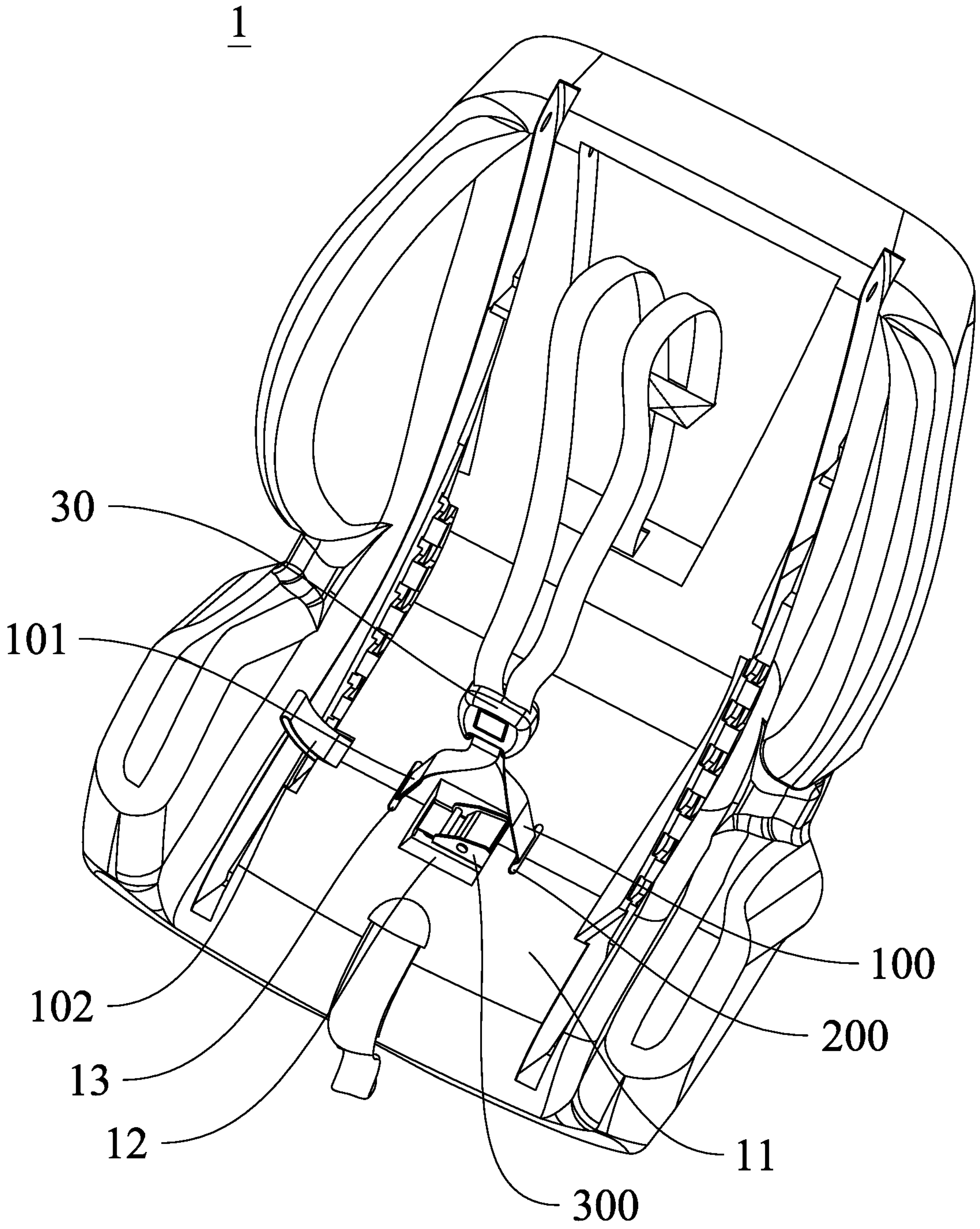
FIG. 2 is a schematic view of the child safety seat as shown in FIG. 1, observed from above.
Figure 3:
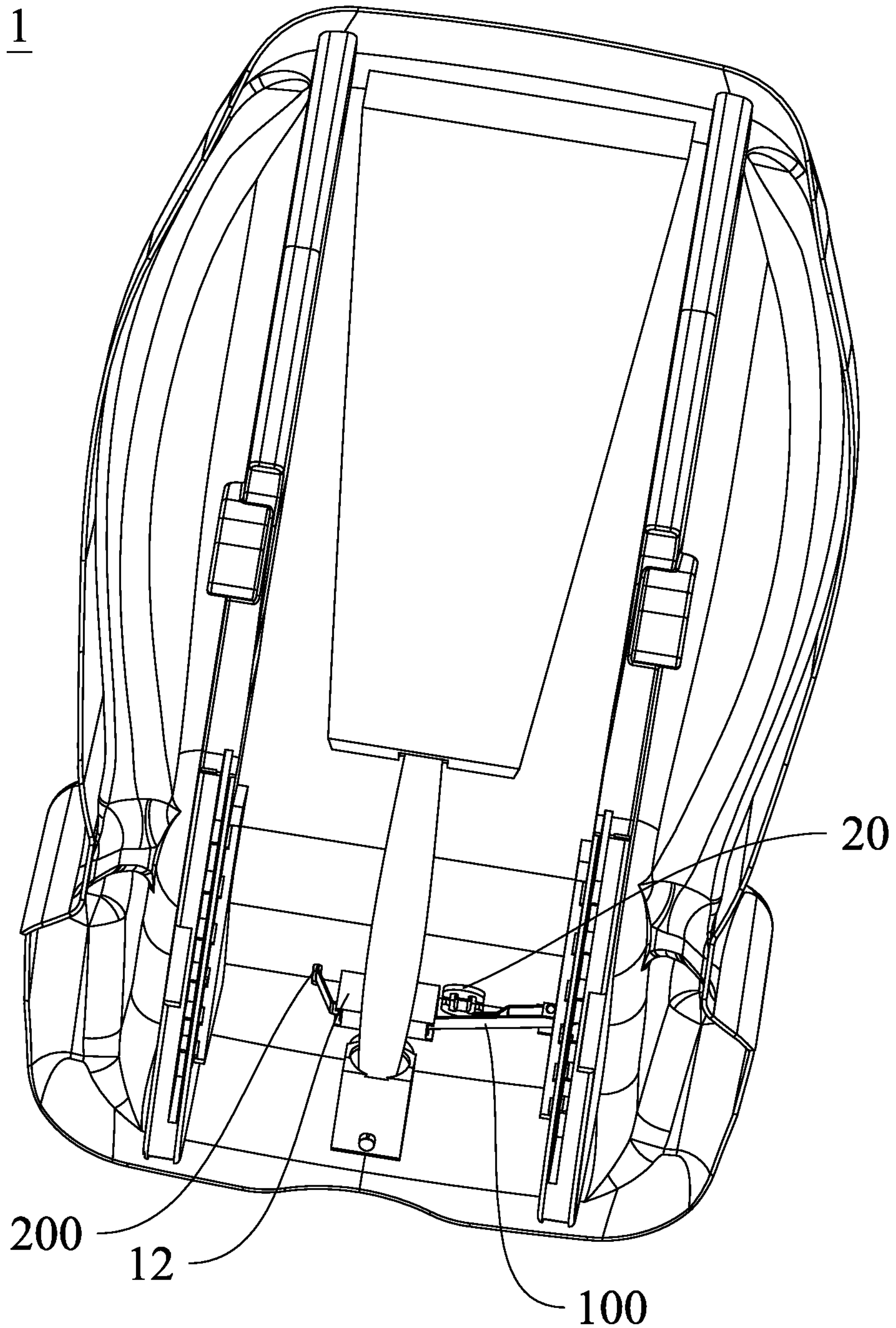
FIG. 3 is a schematic view of the child safety seat as shown in FIG. 1, observed from back.

FIGS. 1 and 2 show a child safety seat 1 with a lap belt length adjusting device according to the present disclosure, in which a lap belt 100 of the child safety seat 1 includes a fixing end 101 and a free end 102 that may be pulled by a user.

The fixing end 101 of the lap belt 100 may be fixed to a seat part 10 of the child safety seat 1. In embodiments as shown in FIGS. 2, 4, 5 and 6, an upper surface 11 of the seat part 10 may be provided with a second opening 13, and the fixing end 101 of the lap belt 100 may be fixed to the second opening 13. In one fixing way, the fixing end 101 of the lap belt 100 may be folded relative to itself for several times after passing through the second opening 13, so that a volume of the fixing end 101 is larger than that of the second opening 13 and then may not be withdrawn from the second opening 13, thereby realizing the fixing. In the embodiments as shown in FIGS. 5 and 6, the fixing end 101 of the lap belt 100 may be connected with a fixing member 20 after passing through the second opening 13, and the fixing member 20 is blocked by the second opening 13, so that the fixing end 101 may not be withdrawn from the second opening 13. Of course, the present disclosure is not limited thereto, and the fixing end 101 of the lap belt 100 may be fixed to the seat part 10 of the child safety seat 1 in various ways, for example, the upper surface 11 of the seat part 10 may be provided with a hook, and the fixing end 101 of the lap belt 100 may be connected to the hook, thereby realizing the fixing.

Figure 4:
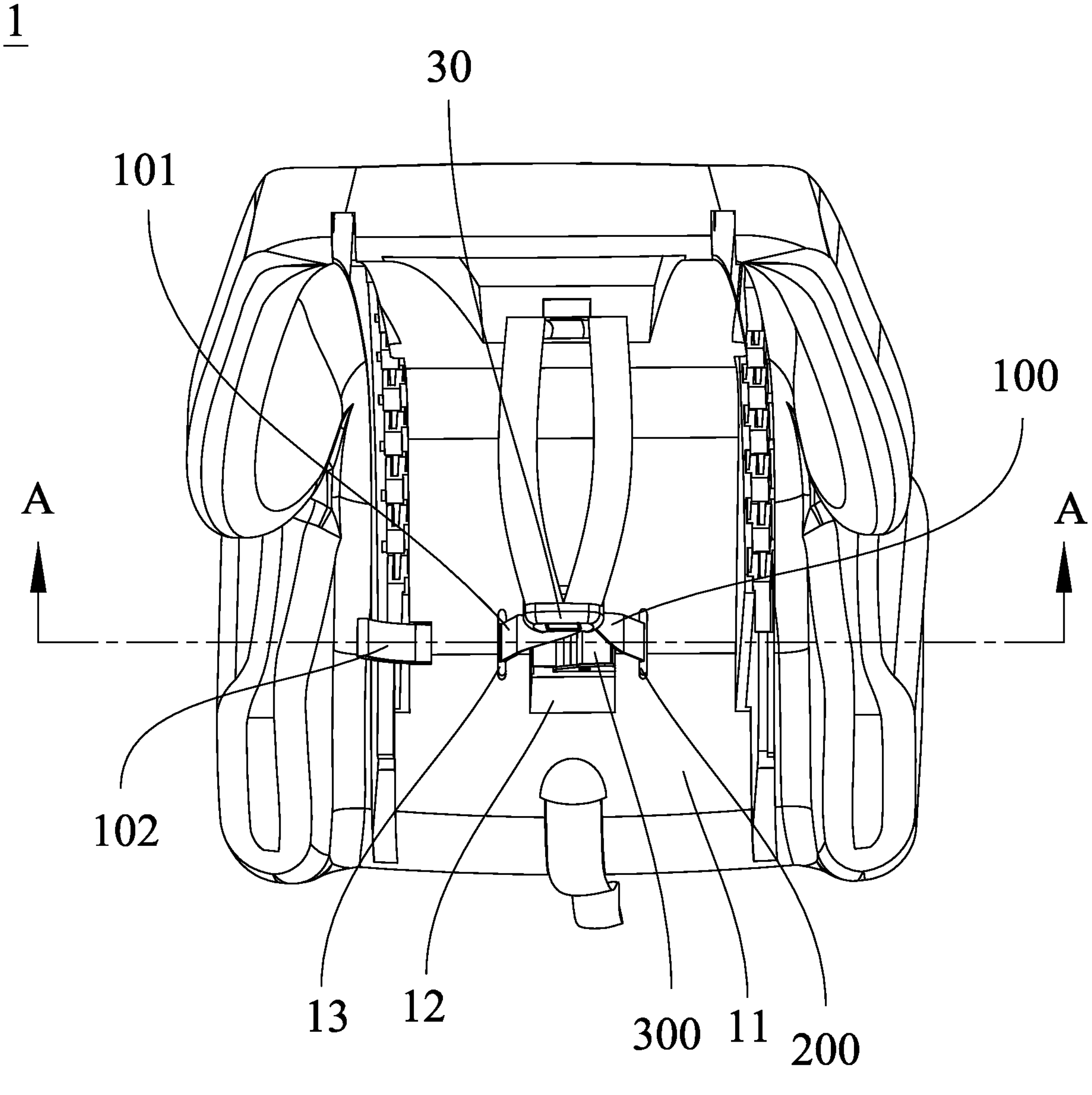
FIG. 4 is a top view of the child safety seat with the lap belt length adjusting device according to an embodiment of the present disclosure.
Figure 5:
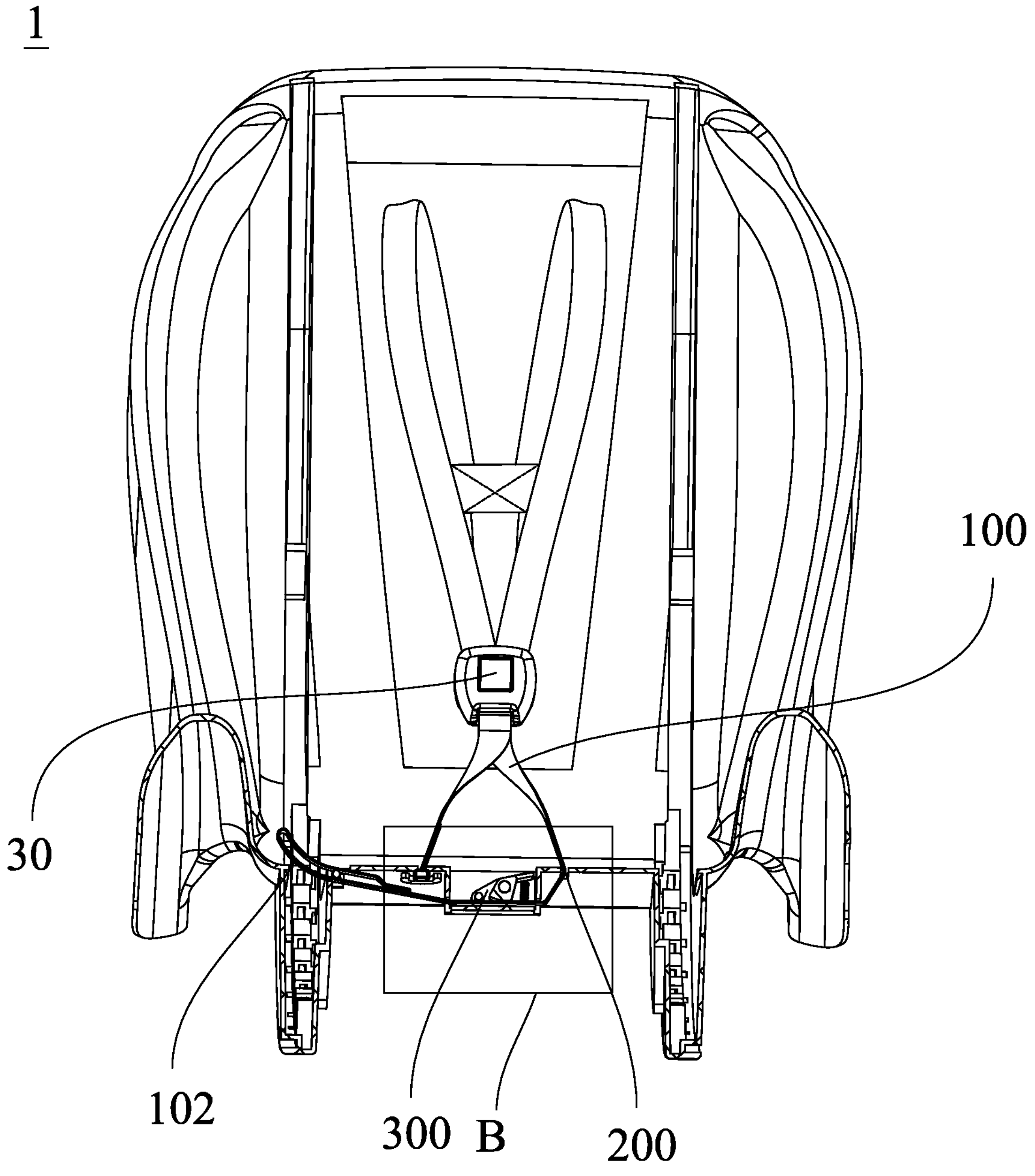
FIG. 5 is a sectional view taken along a line A-A in FIG. 4.
Figure 6:
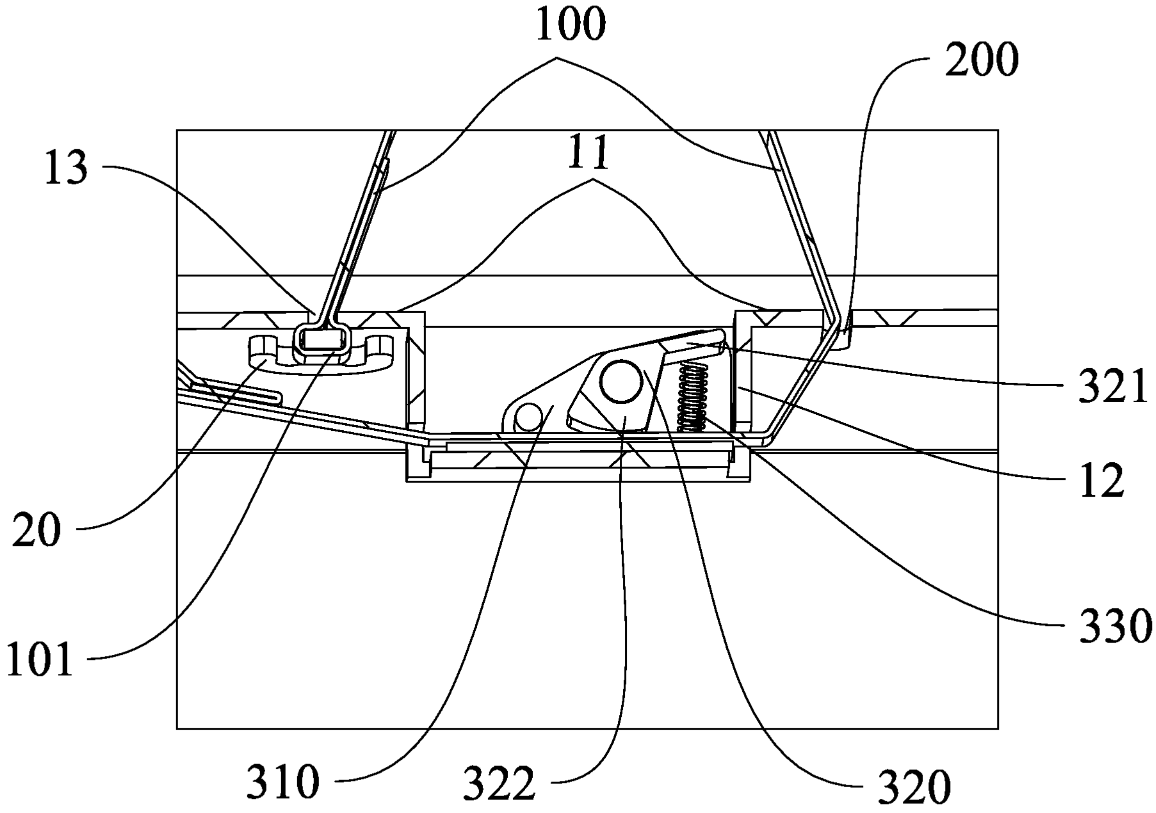
FIG. 6 is an enlarged view of an area B in FIG. 5.

Referring to FIGS. 2, 4 and 5, the lap belt length adjusting device according to the present disclosure may include an adjusting structure 200 and a locking structure 300.

The adjusting structure 200 may be arranged at the seat part 10 and though which the free end 102 may pass, after the free end 102 passes through the adjusting structure 200, a length of a use section of the lap belt 100 between the fixing end 101 and the adjusting structure 200 can be increased or decreased.

It should be explained that the use section of the lap belt 100 may refer to a section of the lap belt 100 between the fixing end 101 and the adjusting structure 200. As the lap belt 100 is not fixedly connected with the adjusting structure 200, the lap belt 100 may slide through the adjusting structure 200, so that the length of the use section of the lap belt 100 can be changed. On one aspect, the user may increase the length of the use section of the lap belt 100 by pulling any portion of the use section of the lap belt 100, on the other aspect, the user may decrease the length of the use section of the lap belt 100 by pulling the free end 102 of the lap belt 100. To this end, the length of the use section of the lap belt 100 can be adjustable in order to be suitable for children of different sizes.

In addition, a buckle 30 may be slidably connected to the use section of the lap belt 100, and the buckle 30 may be configured to connect with the shoulder belt (not shown) of the child safety seat 1.

In the embodiments as shown in FIGS. 2 to 6, the adjusting structure 200 may be a first opening penetrating through the upper surface 11 of the seat part 10, and the free end 102 of the lap belt 100 may pass through the first opening to reach a lower part of the seat part 10. In addition, in this case, the free end 102 may be exposed from the upper surface 11 of the seat part 10 at a side of the seat part 10 in order to facilitate the user to adjust the length of the use section of the lap belt 100 by pulling the free end 102. Of course, the free end 102 may also be exposed to the upper surface 11 of the seat part 10 at other parts of the seat part 10, as long as it is convenient for the user to operate.

Furthermore, the adjusting structure 200 according to the present disclosure is not limited thereto. The adjusting structure 200 may also be a ring part arranged on the upper surface 11 of the seat part 10, and the free end 102 of the lap belt 100 may pass through the ring part. Alternatively, the adjusting structure 200 may adopt other structures as long as the free end 102 of the lap belt 100 may pass through the structure to allow the lap belt 100 to be slidable in the structure.

In the case that the use section of the lap belt 100 may be adjusted to an appropriate length, it is necessary to use a locking structure 300 to prevent the length of the use section of the lap belt 100 from being continuously increased or decreased, so as to keep the use section of the lap belt 100 at the appropriate length.

In the embodiments as shown in FIGS. 5 and 6, the locking structure 300 may include a fixing case 310 and a locking member 320. The fixing case 310 may be fixed to the seat part 10. The fixing case 310 may have a U-shaped structure, and the lap belt may pass through the upper surface on the bottom of the U-shaped structure and may be located between the bottom of the U-shaped structure and the locking member 320. The locking member 320 may be pivoted to the fixing case 310, so that the locking member 320 may be pivotable between a locking state and an unlocking state. The locking member 320 may include an operating end 321 and a locking end 322, in which the operating end 321 may be exposed out of the fixing case 310 to be operated by the user, and the locking end 322 may press and lock the lap belt 100. When the user operates the operating end 321 of the locking member 320 (for example, lift the operating end 321 upward) to pivot the locking member 320 to the locking state, the locking end 322 may press and lock the lap belt 100 to lock the lap belt 100 so as to keep the length of the use section of the lap belt 100 unchanged. When the user presses down the operating end 321 of the locking member 320, the locking member 320 may be pivoted to the unlocking state, the locking end 322 may be far away from the lap belt 100 to unlock the lap belt 100 so as to adjust the length of the use section of the lap belt 100.

In order to simplify the user's operation, as shown in FIGS. 5 and 6, the locking structure 300 may further include an elastic member 330. The elastic member 330 may drive the locking member 320 to pivot toward a direction in which the lap belt 100 is locked (i.e., the locking state). The arrangement of the elastic member 330 not only can omit an operation that the user locks the lap belt 100 manually, but also can facilitate keeping the length of the use section of the lap belt 100 unchanged. The elastic member 330 may be formed of various suitable elastic components such as a compression spring and a torsion spring.

In addition, if the locking structure 300 is located on the upper surface 11 of the seat part 10, the locking structure 300 will occupy part of a sitting area of the seat part 10, which may affect the comfort of children sitting on the seat part 10. In order to avoid this situation, in the embodiments as shown in FIGS. 2 to 6, a lower recess 12 may be disposed on the upper surface 11 of the seat part 10, and the locking structure 300 may be located in the lower recess 12. In this case, the fixing case 310 of the locking structure 300 may be fixed to the lower recess 12, and the lap belt 100 may pass through the lower recess 12 and then pass through the upper surface on the bottom of the U-shaped structure of the fixing case 310 to be located between the bottom of the U-shaped structure and the locking member 320, as shown in FIGS. 5 and 6.

It should be understood that the locking structure 300 according to the present disclosure is not limited thereto. For example, the locking structure 300 may be configured as a clamping structure that may not be fixed to the seat part 10. In the case that the use section of the lap belt 100 is adjusted to an appropriate length, the clamping structure may be clamped at the use section of the lap belt 100 adjacent to the adjusting structure 200. Since the clamping structure cannot pass through the adjusting structure 200, when the free end 102 of the lap belt 100 may be pulled, the clamping structure may be blocked by the adjusting structure 200 such that the lap belt 100 clamped by the clamping structure cannot continue to slide in the adjusting structure 200, to lock the lap belt 100. In the case that the length of the use section of the lap belt 100 is required to be adjusted, as long as the clamping structure may be operated not to clamp the lap belt 100 no longer, the lap belt 100 may be slidable in the adjusting structure 200 to unlock the lap belt 100.

Figure 7:
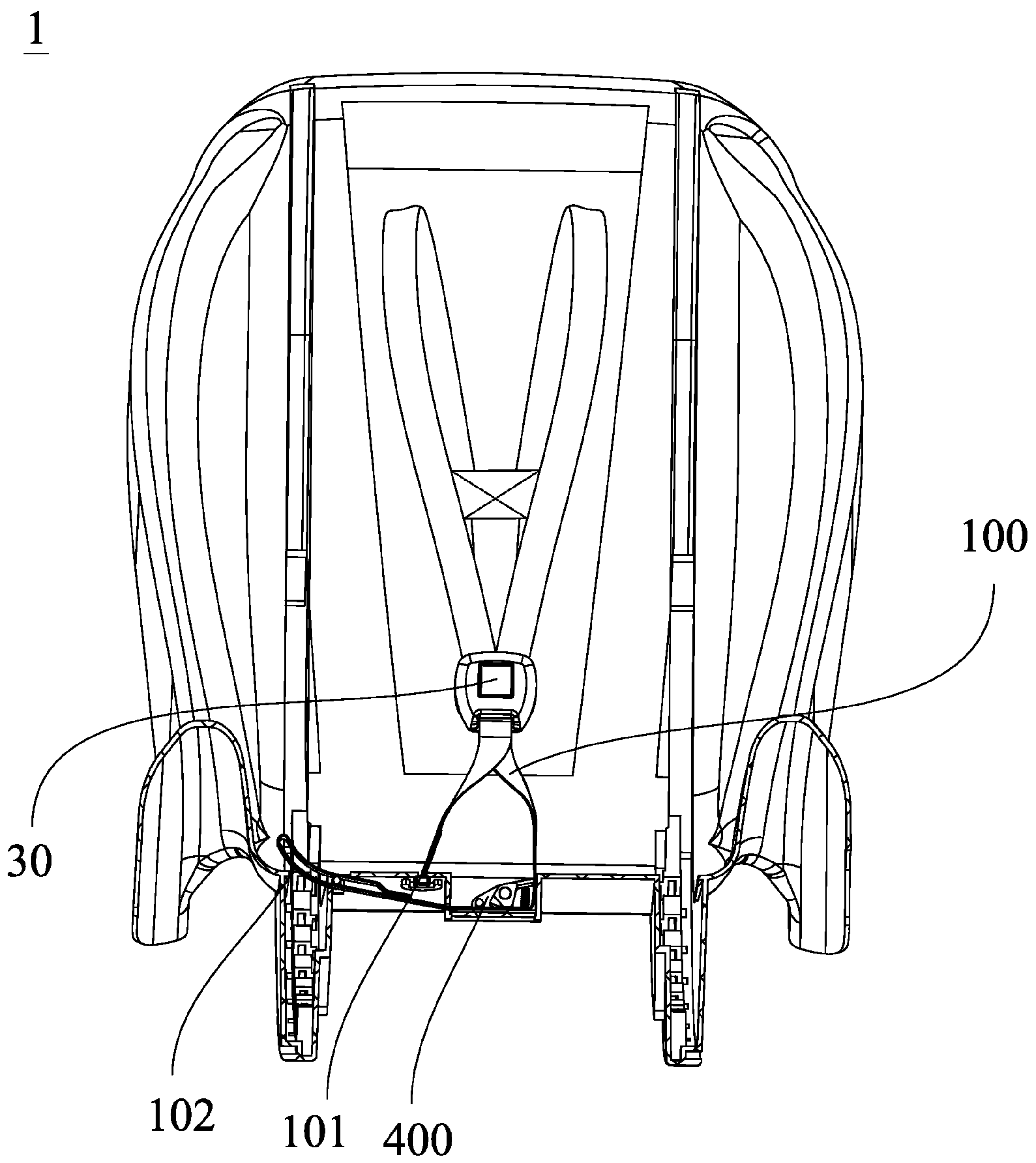
FIG. 7 is a sectional view of a child safety seat with a lap belt length adjusting device according to another embodiment of the present disclosure.

In another embodiment, as shown in FIG. 7, the lap belt length adjusting device according to the present disclosure may only include an adjustable locking structure 400 instead of the adjusting structure 200 and the locking structure 300. The adjustable locking structure 400 may be fixed at the seat part 10 and through which the free end 102 may pass. After the free end 102 passes through the adjustable locking structure 400, the length of the use section of the lap belt 100 between the fixing end 101 and the adjustable locking structure 400 can be increased or decreased. Furthermore, the adjustable locking structure 400 may lock or unlock the lap belt 100 passing therethrough to prevent or allow the increase or decrease of the length of the use section of the lap belt 100 between the fixing end 101 and the adjustable locking structure 400. In the another embodiment, the adjustable locking structure 400 actually integrates the adjusting structure 200 and the locking structure 300 in the preceding embodiment, to play a role of simultaneously adjusting and locking the length of the use section of the lap belt 100.

It should be understood that the adjustable locking structure 400 may be configured in various suitable structures, for example, the aforementioned locking structure fixed to the seat part 10, with difference in that the lap belt 100 may not pass through the first opening, but directly pass through the adjustable locking structure 400, as shown in FIG. 7. Alternatively, the adjustable locking structure 400 may be configured as a clamping structure which may be fixed to the seat part 10, in which the lap belt 100 may pass through the clamping structure, and when the clamping structure clamps the lap belt 100, the lap belt 100 is locked; when the clamping structure releases the lap belt 100, the lap belt 100 is unlocked, in this way, the length of the use section of the lap belt 100 can be adjusted and locked.

As the present features may be embodied in several forms without departing from the characteristics thereof, it should also be understood that the above-described embodiments are not limited by any of the details of the foregoing description, unless otherwise specified, but should be broadly construed within its scope as defined in the appended claims, and therefore all variations and modifications that fall within the metes and bounds of the claims, or equivalents of such metes and bounds are therefore intended to be embraced by the appended claims.

What is claimed is:

1. A lap belt length adjusting device for a child safety seat, wherein a lap belt of the child safety seat comprises a fixing end and a free end, the fixing end is fixed to a seat part of the child safety seat, and the free end is pulled by a user, the lap belt length adjusting device comprises:

an adjusting structure arranged at the seat part and through which the free end passes, wherein after the free end passes through the adjusting structure, a length of a use section of the lap belt between the fixing end and the adjusting structure can be increased or decreased;

a buckle connected to the use section of the lap belt, the buckle being freely slidable along the use section; and a locking structure movably engageable with the lap belt to lock the lap belt between the adjusting structure and the free end, the locking structure being movable out of engagement with the lap belt to allow an increase or decrease in the length of the use section of the lap belt between the fixing end and the adjusting structure.

2. The lap belt length adjusting device according to claim 1, wherein the adjusting structure is a first opening penetrating through an upper surface of the seat part, and the free end of the lap belt passes through the first opening to a bottom of the seat part.

3. The lap belt length adjusting device according to claim 2, wherein a lower recess is arranged on the upper surface of the seat part, and the locking structure is located in the lower recess.

4. The lap belt length adjusting device according to claim 3, wherein the locking structure comprises:

a fixing case having a U-shaped structure and fixed to the lower recess;

a locking member pivoted to the fixing case and comprising an operating end and a locking end, and the operating end being exposed out of the fixing case to be operated by the user;

wherein the lap belt passes through the lower recess and then passes through the upper surface on a bottom of the U-shaped structure to be located between the bottom of the U-shaped structure and the locking member, and the locking end of the locking member is configured to press and lock the lap belt.

5. The lap belt length adjusting device according to claim 4, wherein the locking structure further comprises an elastic member that drives the locking member to lock the lap belt.

6. The lap belt length adjusting device according to claim 4, wherein the free end of the lap belt is exposed to the upper surface of the seat part at a side of the seat part.

7. The lap belt length adjusting device according to claim 1, wherein an opening is arranged on the upper surface of the seat part, and the fixing end of the lap belt is fixed to the opening.

8. The lap belt length adjusting device according to claim 7, wherein the fixing end of the lap belt passes through the opening and then is connected with a fixing member, and the fixing member is blocked by the opening, such that the fixing end is not withdrawn from the opening.

9. The lap belt length adjusting device according to claim 1, wherein a buckle is slidably connected to the lap belt between the fixing end and the adjusting structure.

10. A child safety seat, wherein the child safety seat employs the lap belt length adjusting device according to claim 1.

11. The lap belt length adjusting device according to claim 1, wherein the adjusting structure is arranged at a surface of the seat part, the use section of the lap belt being positioned above the surface of the seat part and the locking structure being beneath the surface of the seat part.

12. The lap belt length adjusting device according to claim 1, wherein the locking member is located between the adjusting structure and the fixing end and the free end extends towards a left side or a right side of the seat part.

13. The lap belt length adjusting device according to claim 1, wherein the upper surface of the seat part is provided with a hook, and the fixing end of the lap belt is connected to the hook, thereby achieving the fixing.

* * * * *